United States Patent
Campbell et al.

(10) Patent No.: US 10,639,733 B2
(45) Date of Patent: May 5, 2020

(54) RECIPROCATING SAW BLADE

(75) Inventors: Doug Campbell, Overland Park, KS (US); Ryan Campbell, Overland Park, KS (US); Russell D. Fries, Smithville, MO (US)

(73) Assignee: SM PRODUCTS, LLC, North Kansas City, MO (US)

( * ) Notice: Subject to any disclaimer, the term of this patent is extended or adjusted under 35 U.S.C. 154(b) by 519 days.

(21) Appl. No.: 14/119,502

(22) PCT Filed: May 27, 2011

(86) PCT No.: PCT/US2011/038360
§ 371 (c)(1),
(2), (4) Date: Nov. 22, 2013

(87) PCT Pub. No.: WO2012/166096
PCT Pub. Date: Dec. 6, 2012

(65) Prior Publication Data
US 2014/0090537 A1    Apr. 3, 2014

(51) Int. Cl.
*B23D 61/12*    (2006.01)
(52) U.S. Cl.
CPC ......... *B23D 61/126* (2013.01); *Y10T 83/9365* (2015.04)
(58) Field of Classification Search
CPC .. B23D 61/126; B23D 61/128; B23D 61/121; Y10T 83/9319; Y10T 83/9454; Y10T 83/687; Y10T 83/9348; Y10T 83/935; B27B 19/006; B27F 5/12; A22B 5/0047; A22B 5/205

USPC ............ 30/329, 392–394; 83/835–855, 660, 83/698.61
See application file for complete search history.

(56) References Cited

U.S. PATENT DOCUMENTS

| | | | | |
|---|---|---|---|---|
| 2,685,734 A | * | 8/1954 | Klein | A22B 5/0047 30/144 |
| 2,987,086 A | | 6/1961 | Westlund, Jr. | |
| 3,028,889 A | * | 4/1962 | McCarty | B23D 61/128 30/166.3 |
| 3,033,251 A | * | 5/1962 | Atkinson | B23D 61/126 30/353 |

(Continued)

FOREIGN PATENT DOCUMENTS

| | | | | |
|---|---|---|---|---|
| CN | 201471008 | | 5/2010 | |
| DE | 3738016 A1 | * | 5/1989 | ........... B23D 61/126 |

(Continued)

OTHER PUBLICATIONS

Extended European Search Report for related EP Patent Application 11866550.4, dated Nov. 20, 2014 (6 pgs).

*Primary Examiner* — Ghassem Alie
*Assistant Examiner* — Bharat C Patel
(74) *Attorney, Agent, or Firm* — Stinson LLP (57) ABSTRACT

A reciprocating saw blade that includes a longitudinal body having a first end and a second end and a first longitudinal cutting edge parallel to a second longitudinal cutting edge. The blade includes a mounting structure located at the first end which is angled at an acute angle relative to the first longitudinal cutting edge. At least one of the first longitudinal cutting edge and the second longitudinal cutting edge has a plurality of teeth oriented for cutting on the substantially push stroke.

15 Claims, 6 Drawing Sheets

(56) References Cited

U.S. PATENT DOCUMENTS

| | | | |
|---|---|---|---|
| 3,109,464 A | 11/1963 | La Force | |
| 3,680,610 A * | 8/1972 | Lindgren | B23D 61/126 30/502 |
| 3,685,373 A | 8/1972 | Norfolk | |
| 3,802,079 A | 4/1974 | Ketchpel, Jr. et al. | |
| 3,977,289 A * | 8/1976 | Tuke | A61B 17/14 30/392 |
| 3,978,862 A * | 9/1976 | Morrison | A61B 17/14 30/393 |
| 4,188,952 A * | 2/1980 | Loschilov | A61B 17/322 30/355 |
| 4,255,858 A * | 3/1981 | Getts | B23D 49/167 30/393 |
| 4,379,362 A * | 4/1983 | Getts | B23D 49/162 30/393 |
| 5,119,708 A * | 6/1992 | Musgrove | B23D 61/123 30/355 |
| 5,155,914 A | 10/1992 | Ohkanda | |
| 5,271,154 A | 12/1993 | Ohkanda | |
| 5,517,889 A * | 5/1996 | Logan | B23D 61/126 83/746 |
| 5,848,473 A | 12/1998 | Brandenburg, Jr. | |
| 5,901,451 A * | 5/1999 | Nakayama | A01G 3/08 30/501 |
| 5,918,525 A * | 7/1999 | Schramm | B23D 61/121 83/835 |
| 5,964,039 A * | 10/1999 | Mizoguchi | B23D 49/165 30/124 |
| D427,865 S | 7/2000 | Mills, Jr. | |
| D448,634 S * | 10/2001 | Hickman | D8/20 |
| D459,172 S | 6/2002 | Bissell | |
| 6,401,585 B1 * | 6/2002 | Morgan | B23D 61/123 30/501 |
| D465,138 S | 11/2002 | Raines | |
| D479,106 S | 9/2003 | Robertsson | |
| D479,107 S | 9/2003 | Rack | |
| D479,447 S | 9/2003 | Rack | |
| D482,945 S | 12/2003 | Grolimund | |
| 6,662,698 B2 | 12/2003 | Wheeler et al. | |
| D484,759 S | 1/2004 | Rack | |
| D485,140 S | 1/2004 | Rack | |
| D485,141 S | 1/2004 | Rack | |
| D485,142 S | 1/2004 | Rack | |
| D485,479 S * | 1/2004 | Rack | D8/20 |
| 6,782,781 B2 * | 8/2004 | Rack | B23D 61/126 30/392 |
| D534,401 S * | 1/2007 | Duffin | D8/20 |
| 7,225,714 B2 | 6/2007 | Rompel et al. | |
| 7,257,900 B2 * | 8/2007 | Wheeler | B23D 51/10 279/77 |
| D565,369 S * | 4/2008 | Dawson | D8/20 |
| 7,600,458 B2 * | 10/2009 | Hampton | B23D 51/08 30/337 |
| 8,888,783 B2 * | 11/2014 | Young | A61B 17/14 606/169 |
| D732,914 S * | 6/2015 | Hampton | D8/20 |
| 2002/0144411 A1 * | 10/2002 | Brooks | B23D 51/10 30/392 |
| 2003/0192419 A1 * | 10/2003 | Conti | B23D 61/126 83/837 |
| 2004/0221461 A1 | 11/2004 | Knisley et al. | |
| 2005/0211023 A1 * | 9/2005 | Kalo | B23D 63/00 76/112 |
| 2005/0211046 A1 | 9/2005 | Thomas et al. | |
| 2005/0262702 A1 * | 12/2005 | Hawthorn | B23D 61/126 30/166.3 |
| 2006/0137498 A1 * | 6/2006 | Bowling | B23D 49/11 83/13 |
| 2008/0172890 A1 * | 7/2008 | Shetterly | B23D 61/126 30/355 |
| 2008/0307936 A1 | 12/2008 | Elliston et al. | |
| 2009/0049973 A1 | 2/2009 | Huffer et al. | |
| 2009/0145280 A1 | 6/2009 | Bucks et al. | |
| 2010/0218389 A1 | 9/2010 | Kalomeris et al. | |
| 2013/0228059 A1 * | 9/2013 | Kazda | B23D 61/121 83/835 |

FOREIGN PATENT DOCUMENTS

| | | | |
|---|---|---|---|
| DE | 9402098 U1 | 7/1994 | |
| DE | 4393469 C2 | 7/1999 | |
| GB | 2429185 A * | 2/2007 | B23D 61/126 |
| JP | 09234624 A * | 9/1997 | |

\* cited by examiner

RECIPROCATING SAW BLADE

FIELD OF THE INVENTION

This invention relates to a reciprocating saw blade for a reciprocating saw apparatus.

DESCRIPTION OF RELATED ART

A conventional reciprocating saw device comprises a power unit having a housing that contains a motor and a transmission that converts rotary movement of the output shaft of the motor to reciprocating linear movement of an output member of the saw device. The device further includes a saw blade removably attached to the output member. The saw device moves the reciprocating saw blade in a reciprocating manner comprising a push stroke and a pull stroke.

The reciprocating saw blade of a conventional reciprocating saw apparatus typically has two longitudinal edges and a mounting structure (often called a tang or shank) at one end of the saw blade. Raines, U.S. Design Patent No. D465,138; Robertsson, U.S. Design Patent No. D479,106; Grolimund, U.S. Design Patent D482,945; Thomas et al., U.S. Patent No. 2005/0211046; Ellison et al., U.S. Patent No. 2008/0307936; Bucks et al., U.S. Patent Application No. 2009/0145280; Kalomeris et al., U.S. Patent Application No. 2010/0218389; LaForce, U.S. Pat. No. 3,109,464; Musgrove, U.S. Pat. No. 5,119,708; Wheeler et al., U.S. Pat. No. 6,662,698; Rompel et al., U.S. Pat. No. 7,225,714; and Hampton et al., U.S. Pat. No. 7,600,458 all illustrate conventional one-sided reciprocating saw blades having teeth along only one longitudinal edge for cutting.

Two-sided reciprocating saw blades having teeth along both longitudinal edges are also known. Conti, U.S. Patent Application No. 2003/0192419; Shetterly, U.S. Patent Application No. 2008/0172890; McCarty, U.S. Pat. No. 3,028,889; Schramm, U.S. Pat. No. 5,918,525; Morgan, U.S. Pat. No. 6,401,585; Rack, U.S. Pat. No. 6,782,781; Mills, Jr., U.S. Design Patent No. D427,865; Hickman, U.S. Design Patent No. D448,634; Bissell, U.S. Design Patent No. D459,172; Rack, U.S. Design Patent No. D479,447; Rack, U.S. Design Patent No. D484,759; Rack, U.S. Design Patent No. D485,140; Rack, U.S. Design Patent No. D485,141; Rack, U.S. Design Patent No. D485,142; Rack, U.S. Design Patent No. D485,479; and Duffin et al., U.S. Pat. No. D534,401 are examples of such saw blades.

While a number of different reciprocating saw blades are known in the art, there remains a need in the art for a two-sided blade that provides high performance cutting and long-term durability for both edges of the blade.

SUMMARY OF THE INVENTION

The present invention is directed to a novel reciprocating saw blade and methods for using the same. The reciprocating saw blade is engageable with a reciprocating saw for driving the reciprocating saw blade in a reciprocating motion comprising a push stroke and a pull stroke. The saw blade includes a longitudinal body having a first end, a second end, a first longitudinal cutting edge, and a second longitudinal cutting edge. The first longitudinal cutting edge and the second longitudinal cutting edge are parallel to each other. At least one of the first longitudinal cutting edge and the second longitudinal cutting edge has a plurality of teeth oriented for cutting substantially on the push stroke. In addition, the saw blade comprises a mounting structure located at the first end which is adapted to be mounted in a blade holder of the saw. The mounting structure is angled at an acute angle relative to the first longitudinal cutting edge.

In another aspect of the present invention, the reciprocating saw blade includes a mounting structure comprising a tang body section having an aperture therein. In yet another aspect, the mounting structure comprises a tang body section having a slot between two tang stems.

In still another aspect, the first longitudinal cutting edge has a plurality of teeth oriented for cutting on the pull stroke, and the second longitudinal cutting edge has a plurality of teeth oriented for cutting on the push stroke.

In another aspect, substantially all of the teeth on the first longitudinal cutting edge have a rake face facing the first end containing the mounting structure of the blade and a relief face facing the second end of the blade.

In yet another aspect, substantially all of the teeth on the second longitudinal cutting edge have a rake face facing the second end of the blade and a relief face facing the first end of the blade containing the mounting structure.

In still another aspect, the second end of the reciprocating saw blade may be substantially free of teeth. Alternatively, the second end may contain a plurality of teeth configured in the same manner as the first longitudinal cutting edge. In yet another aspect, the second end may contain a plurality of teeth configured in the same manner as the second longitudinal cutting edge.

In another aspect, the reciprocating saw blade of the present invention includes a first longitudinal cutting edge in which the teeth on that edge have a different shape than the teeth on the second longitudinal cutting edge. In still another aspect, the first longitudinal cutting edge has teeth that have a different size than the teeth on the second longitudinal cutting edge. In another aspect, the teeth on the first longitudinal cutting edge are substantially the same size and shape as the teeth on the second longitudinal cutting edge.

In still a further aspect, the longitudinal body and either or both of the longitudinal cutting edges are made of different materials. In one aspect, at least one of the first longitudinal cutting edge and the second longitudinal cutting edge is comprised of a strip of tooth material that is welded to the longitudinal body. This permits, for example, the longitudinal body to be comprised of a longitudinal body base material having a hardness on a Rockwell C scale that is between 30 to 60 and the teeth to be comprised of a tooth material having a hardness on a Rockwell C scale between 55 to 69.

In another aspect, the present invention is directed to a method for cutting a substrate using the reciprocating saw blade of the present invention. The method includes the steps of providing a reciprocating saw blade comprising a longitudinal body having a first end, a second end, a first longitudinal cutting edge, and a second longitudinal cutting edge parallel thereto, wherein the second longitudinal cutting edge has a plurality of teeth oriented for cutting substantially on the push stroke, and wherein the blade has a mounting structure located at the first end of the longitudinal body and angled at an acute angle relative to the first longitudinal cutting edge. The method further includes the step of mounting the blade in a blade holder such that the second longitudinal cutting edge faces the substrate and such that the second longitudinal cutting edge is angled away from the substrate. The method also includes the step of cutting the substrate using the second longitudinal cutting edge of the reciprocating saw blade using a reciprocating motion (with cutting occurring substantially on the push stroke). In another aspect, the blade may be reversibly inserted into the blade holder to cut either the same or a different substrate. In such an aspect, the method further comprises the step of removing the reciprocating saw blade from the blade holder; re-mounting the reciprocating saw blade in the blade holder such that the first longitudinal cutting edge faces the substrate; and cutting the substrate using the first longitudinal cutting edge of the reciprocating saw blade using a reciprocating motion (with cutting occurring substantially on the pull stroke).

In another aspect, the method for cutting a substrate includes the steps of providing a reciprocating saw blade comprising a longitudinal body having a first end, a second end, a first longitudinal cutting edge, and a second longitudinal cutting edge parallel thereto, wherein the first longitudinal cutting edge has a plurality of teeth oriented for cutting on the pull stroke, wherein the second longitudinal cutting edge has a plurality of teeth oriented for cutting on the push stroke; and wherein the blade has a mounting structure located at the first end of the longitudinal body and angled at an acute angle relative to the first longitudinal cutting edge, the mounting structure adapted to be mounted in a blade holder. The method further includes the step of mounting the blade in the blade holder such that the first longitudinal cutting edge faces the substrate and such that the first longitudinal cutting edge is angled towards the substrate or is substantially parallel to the substrate (with cutting occurring substantially on the pull stroke). The method also includes the step of cutting the substrate using the first longitudinal cutting edge of the reciprocating saw blade using a reciprocating motion. In another aspect, the blade may be reversibly inserted into the blade holder to cut either the same or a different substrate. In such an aspect, the method further comprises the step of removing the reciprocating saw blade from the blade holder; re-mounting the reciprocating saw blade in the blade holder such that the second longitudinal cutting edge faces the substrate; and cutting the substrate using the second longitudinal cutting edge of the reciprocating saw blade using a reciprocating motion (with cutting occurring substantially on the push stroke).

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1A:
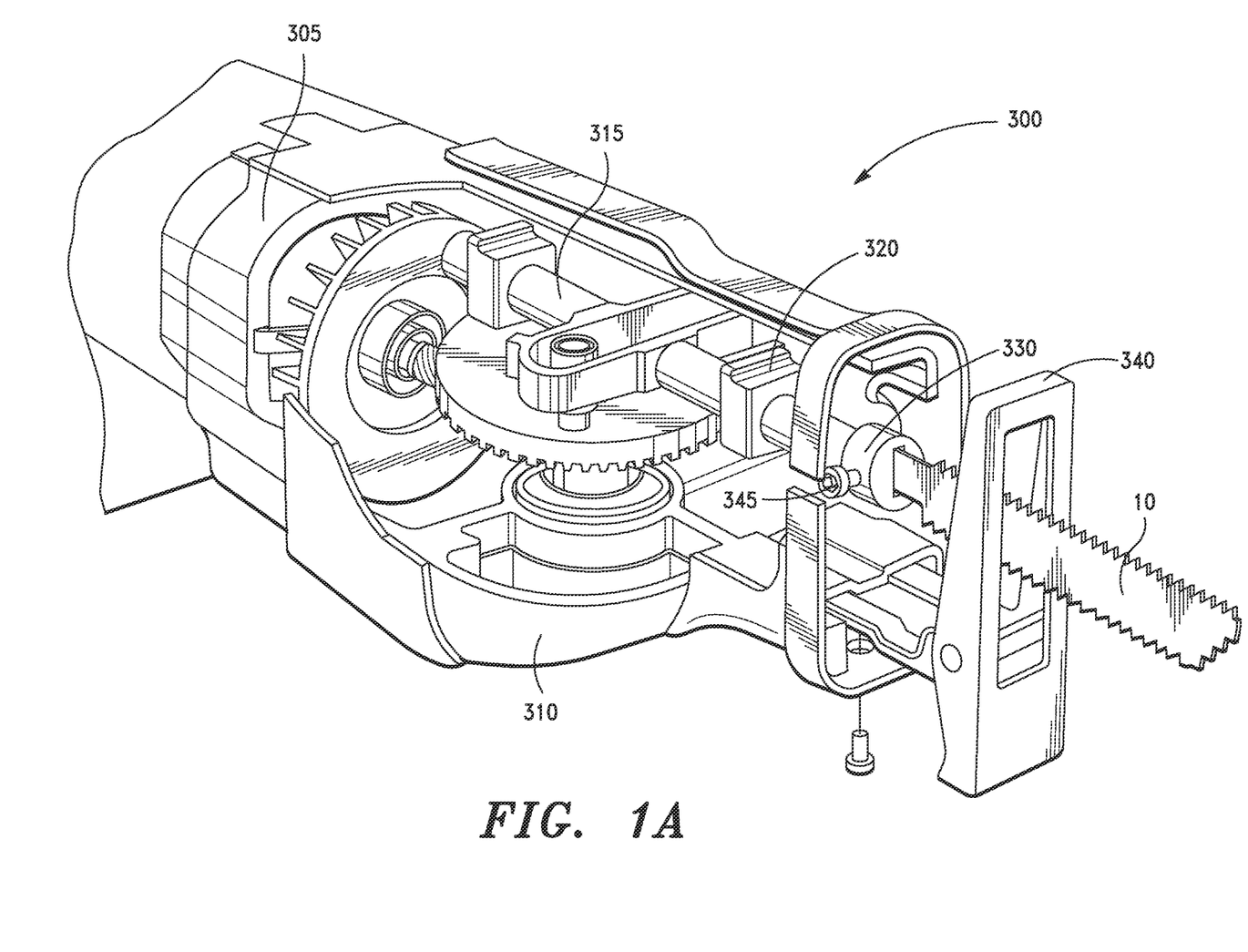
FIG. 1A is a cut-away perspective view of a reciprocating saw that uses a reciprocating saw blade in accordance with a first exemplary embodiment of the present invention.

Referring now to FIGS. 1A to 1F, a reciprocating saw blade 10 for use with a reciprocating saw 300 according to a first exemplary embodiment of the present invention is shown. Reciprocating saw blade 10 is generally designed for use with a conventional reciprocating saw 300 as generally shown in FIG. 1A. Reciprocating saws are commonly used in carpentry and woodworking fields for cutting thin sheets of wood. They may also be used in construction for cutting metals, polymers, plastics, concrete, brick, and other general materials of construction. It should be understood that any type of reciprocating saw may be used with the reciprocating saw blade 10. The majority of commercially available reciprocating saws have the following features: a motor 305 contained within an external housing 310, a linearly or elliptically reciprocating shaft 315 that is joined with the motor via one or more linkages or gears, and a trigger connected to the motor for actuating the motor and the resultant linear or elliptical motion of the shaft. The motor is typically electrically powered via a direct current battery or an electrical cord receiving alternating current from an electrical outlet, however, some motors are pneumatically powered. The end of the reciprocating shaft protrudes through a linear bearing 320 and through an opening in the housing and has a blade holder 330 or chuck which is designed to receive the reciprocating saw blade 10. The reciprocating saw typically includes an adjustable foot or shoe 240 that is placed adjacent to the substrate 15 to be cut during use.

A typical blade holder 330 includes a guide pin 345 protruding from the side of the reciprocating shaft adjacent to the shaft's end that receives a complementary opening/aperture on a typical reciprocating saw blade. The shaft typically has a threaded opening that is positioned adjacent to the guide pin. A clamp fits over the saw blade and has an opening which receives a fastener to secure the clamp and blade to the threaded opening on the reciprocating shaft. The clamp may also have a second opening that is aligned with the opening in the reciprocating saw blade and the guide pin. There are a variety of companies that manufacture reciprocating saws of this type, including companies that sell saws under the following trademarks: DeWalt, Black & Decker, Milwaukee, Delta/Porter-Cable, Makita, Skil, Bosch, Craftsman, and Ryobi. This description of typical reciprocating saws is only illustrative in nature, and it is within the scope of the invention for reciprocating saw blade 10 to be used with any type of reciprocating saw.

As shown in more detail in the drawings, the reciprocating saw blade 10 of the present invention includes a longitudinal body 12 having a longitudinal axis L, a first end 20, and a second end 30. The blade further includes a first longitudinal cutting edge 40 and a second longitudinal cutting edge 50 disposed along the longitudinal body 12. The first end 20 contains an angled mounting structure 22 configured to be mounted to a reciprocating saw, and is preferably configured to be directly mounted in the blade holder 330 of a commercially available reciprocating saw. In the present invention, the teeth on the first longitudinal cutting edge 40 are oriented so that cutting occurs substantially on the pull stroke while the teeth on the second longitudinal cutting edge 50 are oriented so that cutting occurs substantially on the push stroke. The longitudinal cutting edges 40, 50 of the reciprocating saw blade 10 are generally parallel to each other. The longitudinal cutting edges 40, 50 are also generally parallel to the longitudinal axis L of the longitudinal body. The longitudinal cutting edges 40, 50 have a linear edge which is substantially straight (except for the cutting teeth).

The first end 20 of the reciprocating saw blade 10 includes the angled mounting structure 22 (sometimes known as a tang or shank) which secures the blade within the blade holder 330 of the reciprocating saw device 300. In the exemplary embodiment, the mounting structure 22 includes a tang body section 24, an aperture 26, and a slot 28 formed between two tang stems 29 for mounting the blade 10 in the blade holder of the reciprocating saw. The tang stems are preferably rounded at their terminus. Various mounting structures are known in the art. It is within the scope of the present invention that the blade may have any suitable angled mounting structure. The mounting structure, for example, may have a single tang stem or be a stem-less tang.

Figure 1B:
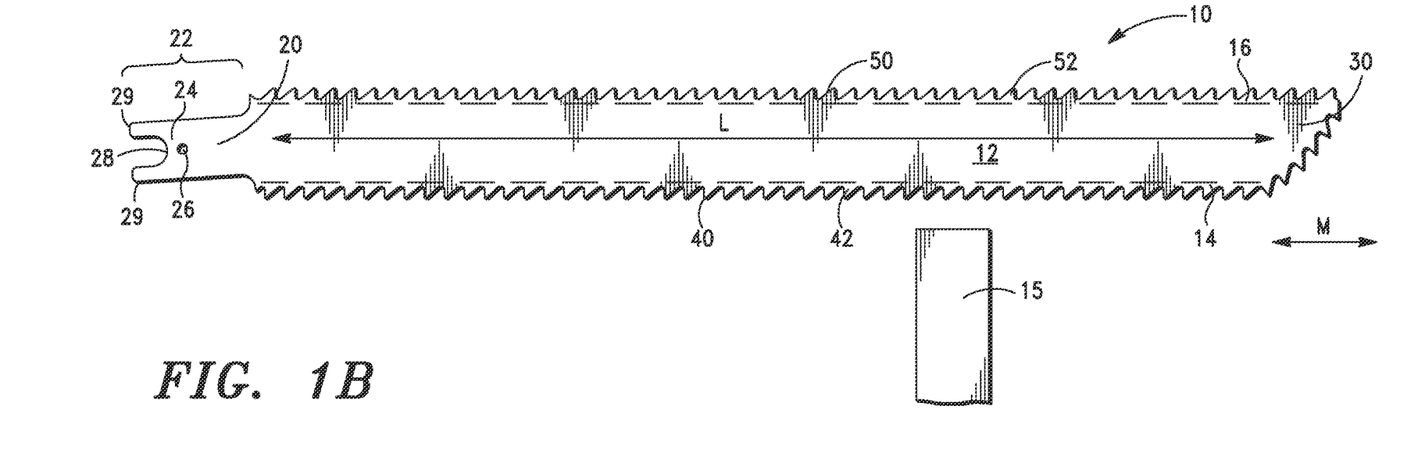
FIG. 1B is a side elevational view of a reciprocating saw blade according to the first exemplary embodiment of the present invention in which the first longitudinal edge faces the substrate to be cut. For clarity, the reciprocating saw is not shown.
Figure 1C:
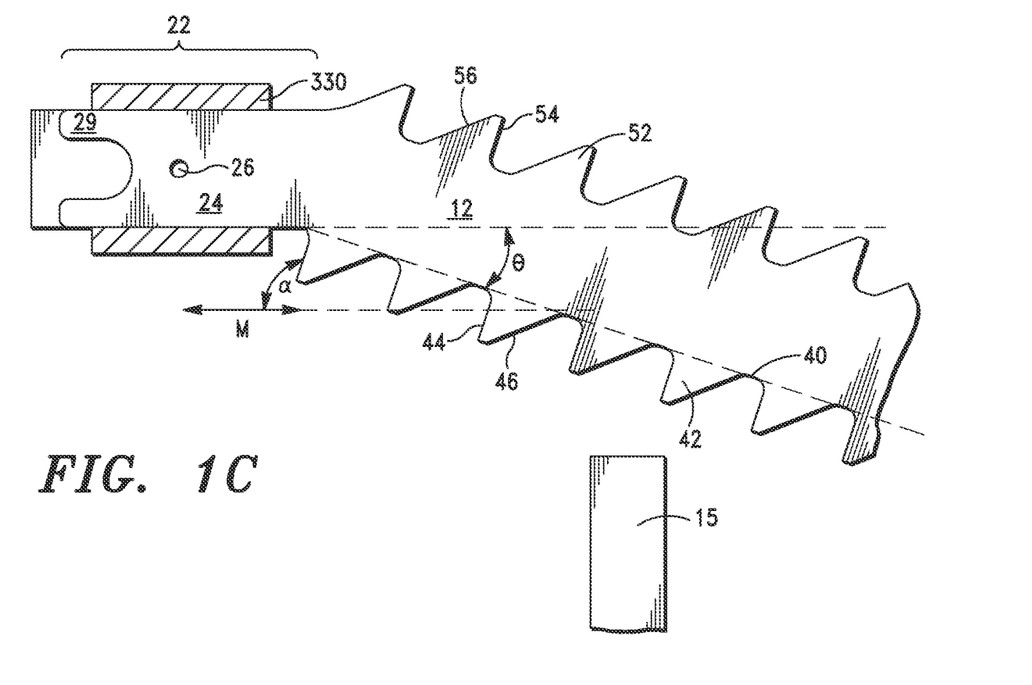
FIG. 1C is a partial side elevational view of the reciprocating saw blade of FIG. 1A mounted within a blade holder of a reciprocating saw.

As shown in more detail in FIG. 1C, the mounting structure 22 of the blade 10 is angled at an acute angle relative to the first longitudinal cutting edge 40 of the longitudinal body 12 of the saw blade 10. The acute tang angle θ is typically about 1 to 10° (e.g., 1, 2, 3, 4, 5, 6, 7, 8, 9, 10°), with about 2 to 4° being most preferred.

The mounting structure is preferably "reversible" such that the reciprocating saw blade may be mounted to a saw device in a first configuration (e.g., the first longitudinal cutting edge 40 facing the substrate to be cut), reversed upside down, and reinserted into the saw device in a second configuration (e.g., with the second longitudinal cutting edge 50 facing the substrate to be cut). Although preferably the reciprocating saw blade 10 is secured to a reciprocating saw as described above, it is within the scope of the invention for the blade to be secured to a reciprocating saw in any manner. For example, the blade may also be mounted to a reciprocating saw having a quick-release chuck. If the blade is being secured to a reciprocating saw that has a different mounting structure than that described above, the first end of the blade can have any structure necessary for mounting to that particular reciprocating saw. Alternatively, the reciprocating saw blade may be indirectly mounted to the reciprocating saw by securing the blade to a connector or adapter that is mounted in the reciprocating saw blade holder.

In the present invention, at least one of the longitudinal cutting edges 40, 50 has a plurality of cutting teeth which are oriented such that cutting the substrate occurs substantially on the push stroke. The other longitudinal cutting edge may have a plurality of cutting teeth which are oriented such that cutting the substrate occurs substantially on the push stroke or substantially on the pull stroke.

In the exemplary embodiment, as shown in more detail in FIG. 1C, the first longitudinal cutting edge 40 (lower edge in FIG. 1C) includes a plurality of teeth 42 oriented such that cutting of the substrate 15 using the first longitudinal cutting edge 40 occurs substantially on the pull stroke (i.e., movement toward the saw and user). In the exemplary embodiment, all of the cutting teeth 42 on the first longitudinal cutting edge 40 are raked towards the first end 20 of the reciprocating saw blade 10. Each tooth 42 preferably has a rake face 44 generally facing the first end 20 of the blade and a sloped or curved relief face 46 generally facing the second end 30 of the blade.

In the exemplary embodiment, the second longitudinal cutting edge 50 (upper edge in FIG. 1C) includes a plurality of teeth 52 oriented such that cutting of the substrate 15 using the second longitudinal cutting edge 50 occurs substantially on the push stroke (i.e., movement away from the saw and user). In the exemplary embodiment, all of the cutting teeth 52 on the second longitudinal cutting edge 50 are raked towards the second end 30 of the reciprocating saw blade 10. Each tooth 52 preferably has a rake face 54 generally facing the second end 30 of the blade and a sloped or curved relief face 56 generally facing the first end 20 of the blade.

As shown in FIG. 1C when the reciprocating saw blade 10 is mounted in a blade holder 330 of the reciprocating saw in the configuration shown in FIG. 1B with the first longitudinal cutting edge 40 facing the substrate 15 to be cut, the first longitudinal cutting edge 40 as it runs from the first end 20 to the second end 30 is angled towards the substrate 15. In the illustrated embodiment, the acute tang angle θ of the blade is substantially equal to the cutting angle α formed between the first longitudinal cutting edge 40 of the blade against the cutting surface of the substrate (cutting line) and the axis of the reciprocating motion M. Of course, it will be appreciated that the cutting angle ∝ may be the same or different than the acute tang angle θ. For example, tang may be mounted in the blade holder at an angle relative to the axis of the reciprocating motion M such that the cutting angle ∝ differs from the acute tang angle θ.

Figure 1D:
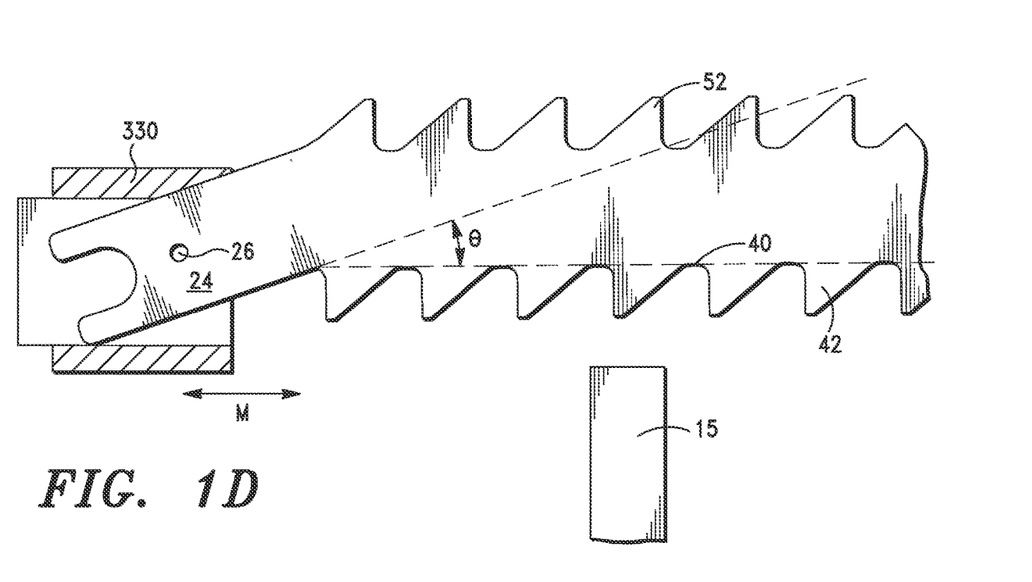
FIG. 1D is a partial side elevational view of the reciprocating saw blade of FIG. 1A mounted within the blade holder of a reciprocating saw, illustrating some play between the mounting structure and the blade holder. The amount of play has been exaggerated in the drawing in order to illustrate the concept of the play, and those skilled in the art should recognize that FIG. 1D is not intended to be an actual representation of the amount of play that occurs during actual use.

Further, as illustrated in FIG. 1D, because there may be some play in how tightly the mounting structure 22 is secured in the blade holder 330, in some cases, the first longitudinal cutting edge 40 as it runs from the first end 20 to the second end 30 may be substantially parallel to the substrate 15 (cutting angle ∝ is approximately 0). The acute tang angle θ permits the longitudinal cutting edge 40 to be substantially parallel to the cutting surface of the substrate 15 (cutting line) and the axis of the reciprocal motion M. That is, because there is often tolerance of the blade holder 330 with respect to the slot size and tang clearance and/or wear on the inner surface of the linear bearing 320 and/or wear on the outer surface of the shaft 215, there may be some play in how tightly the mounting structure 22 is secured to the blade holder 330. As a result, there may be change in the blade angle with respect to the face of the adjustable foot 240 and a change to the cutting angle ∝.

To use the reciprocating saw blade 10, the operator places the reciprocating blade into the blade holder 330 of the reciprocating saw using the mounting structure 22. As shown in FIGS. 1B, 1C, and 1D, the reciprocating saw blade is oriented in the reciprocating saw such that the first longitudinal cutting edge 40 faces the substrate 15 to be cut. The user contacts the reciprocating saw blade with the substrate to cut using repeating push strokes and pull strokes. Because the mounting structure 22 is angled at an acute angle θ relative to the first longitudinal cutting edge 40 of the saw blade 10 (typically about 2 to 4°), the first longitudinal cutting edge as it runs from the first end 20 to the second end 30 is typically angled towards the cutting surface (FIG. 1C) or is substantially parallel thereto (if there is play in the connection to the blade holder, for example) (FIG. 1D). With this angled or parallel orientation, little or no friction occurs on the push stroke and the substrate 15 is cut substantially on the pull stroke.

Figure 1E:
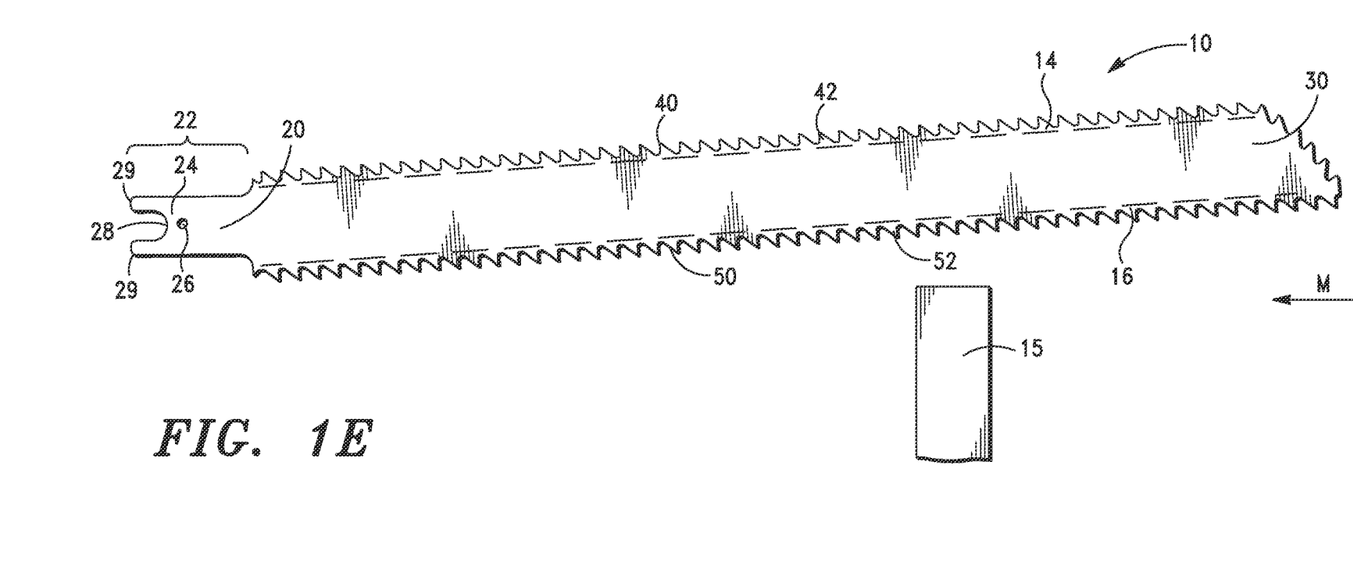
FIG. 1E is a side elevational view of a reciprocating saw blade in accordance with the first exemplary embodiment in which the second longitudinal edge faces the substrate to be cut. For clarity, the reciprocating saw is not shown.

FIG. 1E shows the same reciprocating saw blade 10 being used such that the second longitudinal cutting edge 50 faces the substrate 15 to be cut. The reciprocal saw blade may be reversibly inserted into the blade holder 330 of the sawing device, for example. In this configuration, the teeth 52 are raked towards the second end 30 of the reciprocating saw blade. Each tooth 52 on the second longitudinal cutting edge 50 preferably has a rake face 54 generally facing the second end 30 of the blade and a relief face 56 generally facing the first end 20 of the blade.

Figure 1F:
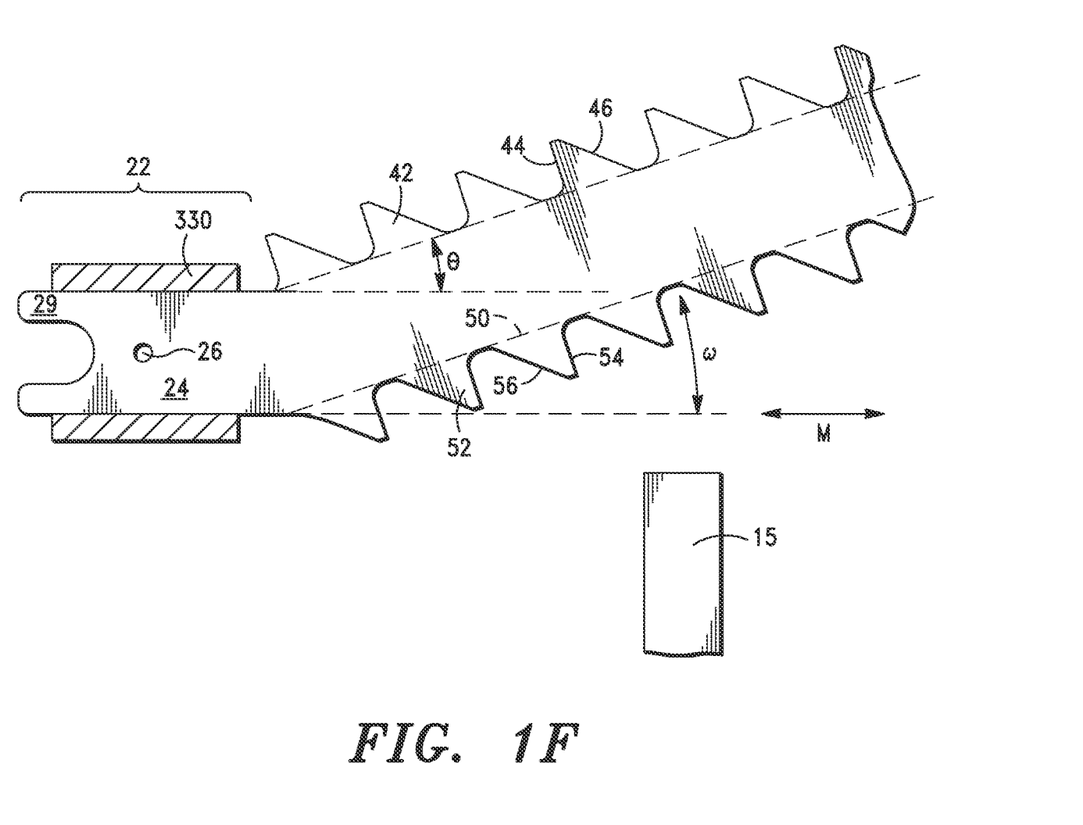
FIG. 1F is a partial side elevational view of the reciprocating saw blade of FIG. 1E mounted within a blade holder of a reciprocating saw.

As shown in more detail in FIG. 1F, when the second longitudinal cutting edge 50 faces the substrate 15 to be cut, the second longitudinal cutting edge 40 as it runs from the first end 20 to the second end 30 is angled away from the substrate 15. In the illustrated embodiment, the acute tang angle θ is substantially equal to the cutting angle ω formed between the second longitudinal cutting edge 50 blade against the substrate surface (cutting line) and the axis of the reciprocating motion M. Of course, it will be appreciated that the cutting angle ω may be the same or different than the acute tang angle θ. For example, because there may be some play in how the mounting structure 22 is secured to the blade holder 330, in some cases, the acute tang angle θ may cause the second longitudinal cutting edge 50 of the blade 10 to be significantly angled away from the cutting surface of the substrate 15. That is, the cutting angle ω may be greater than the acute tang angle θ of the blade.

As shown in FIGS. 1E and 1F, the user contacts the reciprocating blade with the substrate to cut the substrate using repeating push strokes and pull strokes. Because the mounting structure 22 is angled at an acute angle relative to the first longitudinal cutting edge 40 of the saw blade 10 (typically about 2 to 4°), the second longitudinal cutting edge 50 as it runs from the first end 20 to the second end 30 is typically angled away from the cutting surface of the substrate 15. Cutting occurs substantially on the push stroke, which in this angled orientation relative to the substrate results in less friction and deterioration to the blade teeth.

Figure 2A:
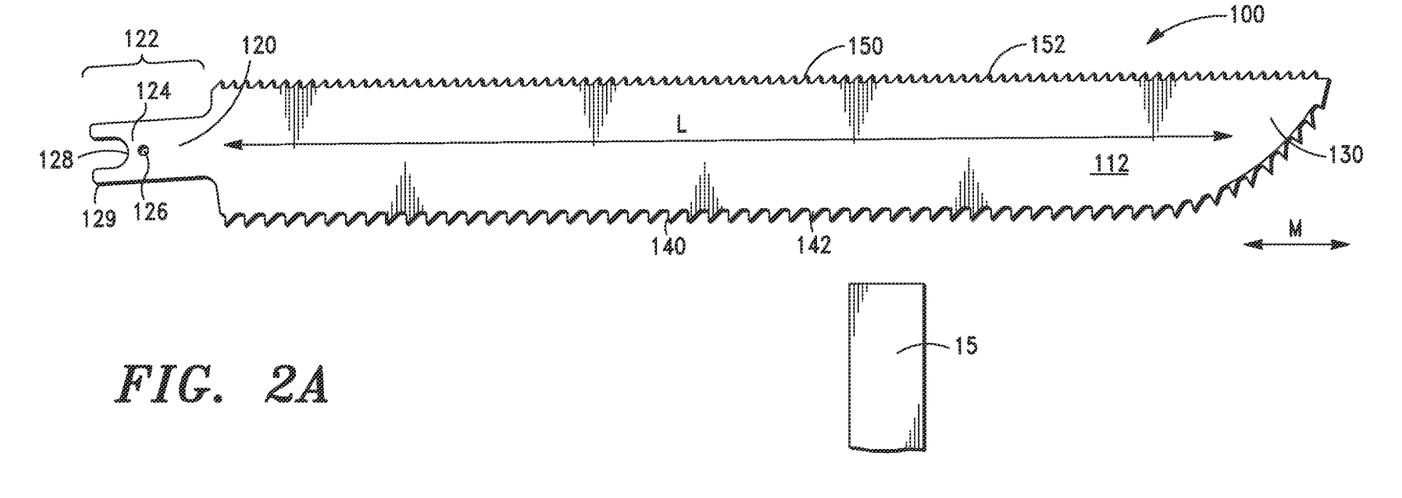
FIG. 2A is a side elevational view of a reciprocating saw blade according to a second exemplary embodiment of the present invention in which the first longitudinal edge faces the substrate to be cut. For clarity, the reciprocating saw is not shown.
Figure 2B:
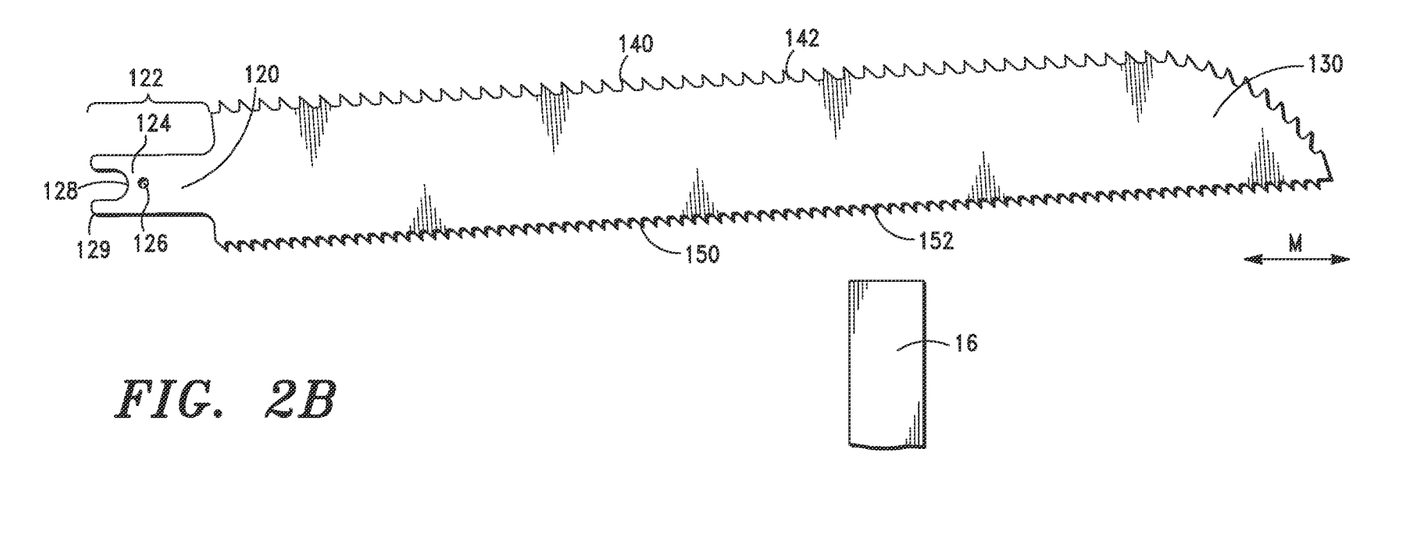
FIG. 2B is a side elevational view of a reciprocating saw blade shown in FIG. 2A in which the second longitudinal edge faces the substrate to be cut. For clarity, the reciprocating saw is not shown.

Referring now to FIGS. 2A to 2B, a reciprocating saw blade 100 according to a second exemplary embodiment of the present invention is shown. The blade 100 includes a longitudinal body 112 having a longitudinal axis L, a first end 120, and a second end 130. The blade 100 includes a first longitudinal cutting edge 140 and a second longitudinal cutting edge 150 disposed along the longitudinal body 112. The first and second longitudinal cutting edges 140, 150 are generally parallel to each other. The longitudinal cutting edges 140, 150 have a linear edge which is substantially straight (except for the cutting teeth). The first end 120 contains a mounting structure 122 configured to be mounted to a reciprocating saw, and is preferably configured to be directly mounted in the blade holder 330 of a commercially available reciprocating saw. The mounting structure 122 includes a tang body section 124, an aperture 126, and a slot 128 formed between two tang stems 129 for mounting the blade 100 in the blade holder of the reciprocating saw. The reciprocating saw blade 100 is similar to the blade in the first embodiment 10 except that the teeth 142 utilized on the first longitudinal cutting edge 140 are different than the teeth 152 on the second longitudinal cutting edge 152. More specifically, the number of teeth per inch ("TPI") is larger for the second longitudinal cutting edge 150 compared to that in the first longitudinal cutting edge 140 (e.g., 14 TPI vs. 10 TPI). Further, the teeth on the second longitudinal cutting edge 150 have a smaller tooth height compared to the teeth on the first longitudinal cutting edge 140 (e.g., 0.07 inch vs. 0.045 inch). In FIG. 2A, the blade is used to cut a first substrate 15 using the first longitudinal cutting edge 140. In FIG. 2B, the blade has been reversibly inserted into the reciprocating saw (not shown) to cut a second substrate 16.

Figure 3A:
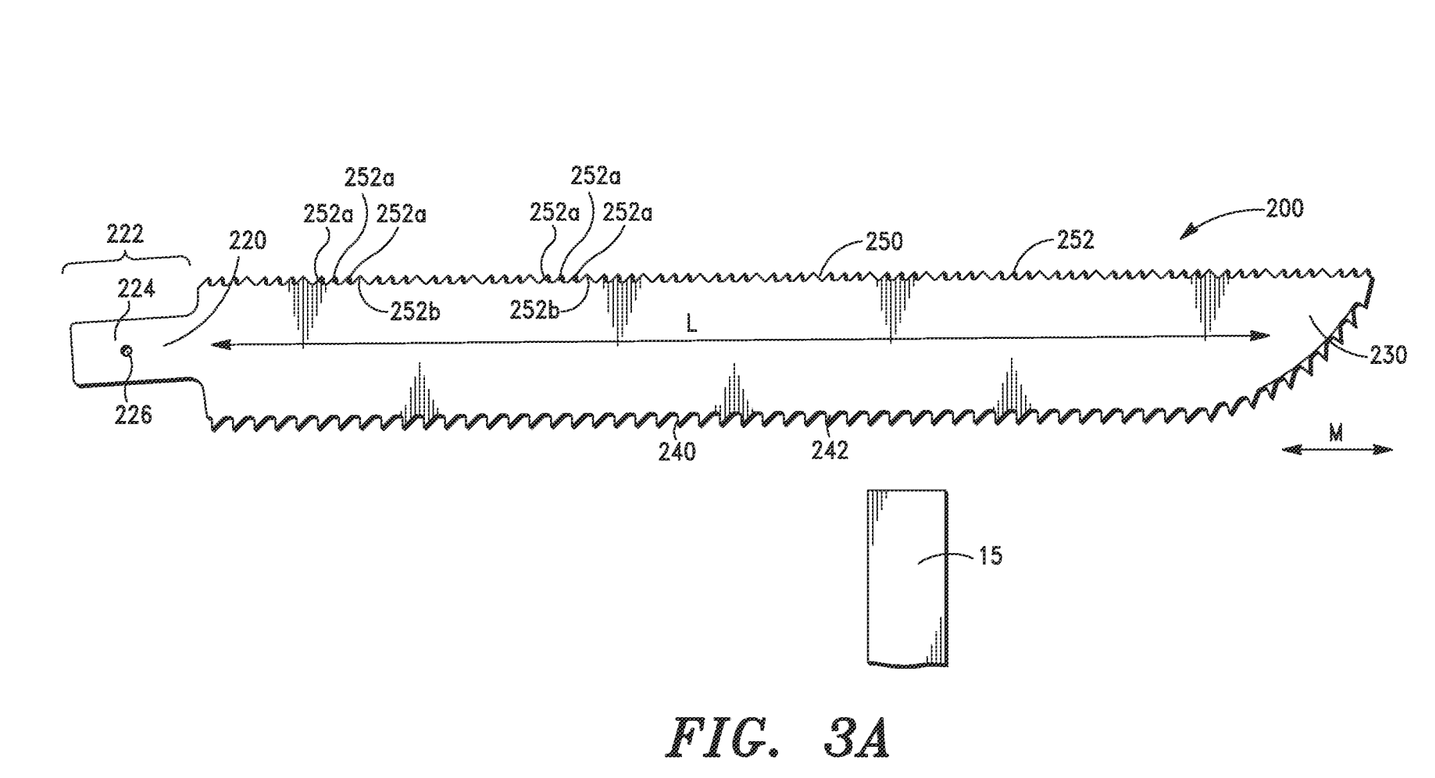
FIG. 3A is a side elevational view of a reciprocating saw blade according to a third exemplary embodiment of the present invention in which the first longitudinal edge faces the substrate to be cut. For clarity, the reciprocating saw is not shown.

Referring now to FIG. 3A, a reciprocating saw blade 200 according to a third exemplary embodiment of the present invention is shown. The blade 200 includes a longitudinal body 212 having a longitudinal axis L, a first end 220, and a second end 230. The blade 200 includes a first longitudinal cutting edge 240 and a second longitudinal cutting edge 250 disposed along the longitudinal body 212. The first and second longitudinal cutting edges 240, 250 are generally parallel to each other. The first end 220 contains a mounting structure 222 configured to be mounted to a reciprocating saw, and is preferably configured to be directly mounted in the blade holder 330 of a commercially available reciprocating saw. The mounting structure 222 includes a tang body section with an aperture 226 for mounting the blade 200 in the blade holder of the reciprocating saw.

The first longitudinal cutting edge 240 includes a plurality of teeth 242 oriented such that cutting of the substrate 15 using the first longitudinal cutting edge 240 occurs substantially on the pull stroke (i.e., movement toward the saw and user). In the exemplary embodiment, all of the cutting teeth 242 on the first longitudinal cutting edge 40 are raked towards the first end 220 of the reciprocating saw blade 210. Each tooth 242 preferably has a rake face generally facing the first end 220 of the blade and a sloped or curved relief face generally facing the second end 230 of the blade.

The second longitudinal cutting edge 250 includes a plurality of teeth 252 oriented such that cutting of the substrate 15 using the second longitudinal cutting edge 250 occurs substantially on the push stroke (i.e., away from the saw and user). In the exemplary embodiment, cutting teeth 252a on the second longitudinal cutting edge 250 are raked towards the second end 230 of the reciprocating saw blade 210. Each tooth 252a preferably has a rake face generally facing the second end 230 of the blade and a sloped or curved relief face generally facing the first end 220 of the blade. There are also a plurality of cutting teeth 252b on the second longitudinal cutting edge 250 are raked towards the first end 220 of the reciprocating saw blade 210. Each tooth 252b preferably has a rake face generally facing the first end 220 of the blade and a sloped or curved relief face generally facing the second end 230 of the blade. In the exemplary embodiment, three cutting teeth 252a raked towards the second end 230 are separated by one tooth 252b raked toward the first end 220 in repeating patterns. Thus, overall, about 75% of the teeth 252 on the second longitudinal cutting edge 250 are oriented for cutting on the push stroke.

The foregoing embodiment illustrates that to cut a substrate substantially on the pull stroke, the longitudinal cutting edge should have more than 50% of the teeth oriented such that they are raked towards the first end (tang end) of the reciprocating saw blade. For example, more than 50%, 55%, 60%, 65%, 70%, 75%, 80%, 90%, 95%, or 100% (or some range therebetween) of the teeth along the longitudinal cutting edge may be raked towards the first end of the blade. There may be teeth or teeth sections which are raked towards the first end of the blade interspersed with teeth or teeth sections (two or more adjacent teeth) that are oriented towards the second end of the blade, provided that the number and location of the teeth raked towards the first end of the blade permit the operator to cut substantially on the pull stroke.

Likewise, to cut a substrate substantially on the push stroke, the longitudinal cutting edge should have more than 50% of the teeth oriented such that they are raked towards the second end (not containing the tang) of the reciprocating saw blade. For example, more than 50%, 55%, 60%, 65%, 70%, 75%, 80%, 90%, 95%, or 100% (or some range therebetween) of the teeth along the longitudinal cutting edge may be raked towards the second end of the blade. There may be teeth or teeth sections which are raked towards the second end of the blade interspersed with teeth or teeth sections (two or more adjacent teeth) that are oriented towards the first end of the blade, provided that the number and location of the teeth raked towards the second end of the blade permit the operator to cut substantially on the push stroke.

In the exemplary embodiments, the blades have been illustrated such that the substrate lies below the blade. As discussed above, the first longitudinal cutting edge may face the substrate to be cut (e.g., FIGS. 1B, 2A, and 3A) or the second longitudinal cutting edge 50 may face the substrate to be cut (e.g., FIGS. 1E and 2B). The illustrated embodiments are for convenience only in describing the invention and aspects thereof, but does not in any way mandate usage of the blade in any orientation limited by the direction of gravity. For example, the substrate 15 may be located above the blade. Further, the substrate may be located both above and below the reciprocating saw blade. For example, an opening in a substrate to be cut may be formed (typically by plunging the second end of the blade into the substrate to form the opening) and then the blade may be inserted into the opening to cut the substrate using both longitudinal cutting edges of the blade (e.g., by moving the blade up and down or from side to side).

The reciprocating saw blade of the present invention may be used to cut the same or different substrates. For example, the blade can first be used to cut a first substrate (e.g., a wood substrate) using the first longitudinal cutting edge. The blade can then be reversibly inserted into the cut the same substrate (the same wood substrate) or a different second substrate (e.g., a sheetrock substrate) using the second longitudinal cutting edge. Further, the reciprocating saw blade of the present invention may be used to cut the same substrate with both longitudinal edges. For example, an opening in a substrate to be cut may be formed (typically by plunging the second end 30 of the blade into the substrate to form the opening) and then the blade may be inserted into the opening to cut the substrate using both longitudinal cutting edges of the blade.

As discussed above, in the present invention, at least one of the longitudinal cutting edges is designed so that cutting occurs substantially on the push stroke. In the preferred aspect, the first longitudinal cutting edge is designed so that cutting occurs substantially on the pull stroke while the second longitudinal cutting edge is designed so that cutting occurs substantially on the push stroke. Various cutting teeth designs and patterns may be used in order to achieve the desired result. For example, various sizes and shapes of the rake face, relief face, and gullet portion of the teeth may be used in accordance with the present invention. Further, the gullet radius, gullet depth/tooth height (distance from the tip of the tooth to the curved portion of the gullet), tooth thickness (dimension of the tooth from side to side), tooth set (bending of the teeth from right to left), tooth pitch (distance from the tip of one tooth to the tip of the next tooth), TPI (number of teeth per inch as measured from gullet to gullet), and/or rake angle (angle of the tooth as measured with respect to a line perpendicular to the cutting direction) may be the same or different in each of the longitudinal cutting edges. The cutting edge may be a so-called raker set, vari-raker set, wavy set, standard tooth, hook tooth, skip tooth, alternate set, and variable tooth rakes. Further, the teeth need not span the entire longitudinal edge of the blade, but instead may reside on only a portion thereof. Further, teeth may be designed to achieve any desired kerf (the size of the cut made by the blade). Exemplary tooth designs are described in Raines, U.S. Design Patent No. D465,138; Robertsson, U.S. Design Patent No. D479,106; Grolimund, U.S. Design Patent D482,945; Thomas et al., U.S. Patent No. 2005/0211046; Ellison et al., U.S. Patent No. 2008/0307936; Bucks et al., U.S. Patent Application No. 2009/0145280; Kalomeris et al., U.S. Patent Application No. 2010/0218389; LaForce, U.S. Pat. No. 3,109,464; Musgrove, U.S. Pat. No. 5,119,708; Wheeler et al., U.S. Pat. No. 6,662,698; Rompel et al., U.S. Pat. No. 7,225,714; Hampton et al., U.S. Pat. No. 7,600,458; Conti, U.S. Patent Application No. 2003/0192419; Shetterly, U.S. Patent Application No. 2008/0172890; McCarty, U.S. Pat. No. 3,028,889; Schramm, U.S. Pat. No. 5,918,525; Morgan, U.S. Pat. No. 6,401,585; Rack, U.S. Pat. No. 6,782,781; Mills, Jr., U.S. Design Patent No. D427,865; Hickman, U.S. Design Patent No. D448,634; Bissell, U.S. Design Patent No. D459,172; Rack, U.S. Design Patent No. D479,447; Rack, U.S. Design Patent No. D484,759; Rack, U.S. Design Patent No. D485,140; Rack, U.S. Design Patent No. D485,141; Rack, U.S. Design Patent No. D485,142; Rack, U.S. Design Patent No. D485,479; and Duffin et al., U.S. Patent No. D534,401, all of which are incorporated by reference. Further, each of the foregoing parameters may vary within a given longitudinal cutting edge.

It will be appreciated that the second end of the reciprocating saw blade may have any suitable configuration as is known in the art. It may be pointed, rounded, curved, knifed, blunt, or plunging nose, for example. Further, the second end of the reciprocating saw blade may be free of teeth or optionally include a plurality of teeth. The teeth at the second end may be configured to provide for cutting on the pull stroke or the push stroke, or a combination thereof. Preferably the second end is rounded and knifed such that the teeth are configured in the same manner as the first longitudinal cutting edge to provide for cutting substantially on the pull stroke as generally illustrated in the exemplary embodiments.

The reciprocating saw blade(s) of the present invention may have any suitable length, with lengths of about 6 to 10 inches (e.g., about 6, 7, 8, 9, or 10 inches or some range therebetween) being most preferred. Further, although the TPI on the longitudinal edges of the reciprocating saw blade may vary, the blade preferably has about 5 to 20 TPI (e.g., about 5, 6, 7, 8, 9, 10, 11, 12, 13, 14, 15, 16, 17, 18, 19, or 20 inches or some range therebetween). Likewise, although teeth of various heights may be utilized, the teeth used are preferably between 0.03 and 0.5 inches (e.g., about 0.03, 0.04, 0.05, 0.06, 0.07, 0.08, 0.09, 0.1, 0.12, 0.13, 0.14, 0.15, 0.16, 0.17, 0.18, 0.19, 0.2, 0.25, 0.3, 0.35, 0.4, 0.45, or 0.5 inches or some range therebetween).

The size and shape of the mounting structure may also vary. Typically, the tang has a length of about 0.5 to 1.2 inches (e.g., about 0.5, 0.6, 0.7, 0.8, 0.9, 1.0, 1.1, or 1.2 inches or some range therebetween) and a width of about 0.7 to 1.5 inches (e.g., about 0.7, 0.8, 0.9, 1.0, 1.1, 1.2, 1.3, 1.4, or 1.5 inches or some range therebetween). The slot is preferably curved and has a radius of curvature of about 0.05 to 0.2 inches, with about 0.1 inches being most preferred. The tang stem preferably has a length of about 0.4 to 0.8 inches (e.g., 0.4, 0.5, 0.6, 0.7, 0.8, 0.9 inches or some range therebetween) from the tang body. The tang stem is preferably rounded such that the terminus has a radius of curvature ranging between 0.01 to 0.1 inches, with a radius of curvature of 0.05 inches being most preferred. In addition, the transitions between the tang and the longitudinal body may be rounded, for example, a radius of curvature of about 0.05 to 0.2 inches, with about 0.1 inches being most preferred.

The reciprocating saw blades of the present invention can be manufactured from any suitable cutting material, and is preferably comprised of metal, such as steel or aluminum. For a metal blade, it is within the scope of the invention for any type of heat treatment to be applied to the blade so that the blade has desirable physical properties such as tensile strength, elasticity, and hardness.

The reciprocating saw blades of the present invention may be comprised of a unitary piece of material. Alternatively, the reciprocating saw blade may comprise more than one material so that different portions of the blade have different characteristics. The different materials may be bonded or joined by any manner including, but not limited to, adhesive, fasteners, brazing, chemical vapor deposition, physical vapor deposition, welding, and sintering.

In one aspect, the teeth of the longitudinal cutting edge(s) are formed from, tipped with, coated with, or welded to, a different material than the longitudinal body. For example, the blade may be comprised of a generally rectangular longitudinal body 12 formed from longitudinal body base material welded to strips 14, 16 of a teeth material that form the longitudinal cutting edges. An exemplary delineation (e.g., weld line) between the longitudinal body 12 and the strips 14, 16 is illustrated in FIGS. 1B and 1E by dashed lines.

In a preferred aspect, the longitudinal body base material has a yield tensile strength that is between approximately 60,000 to 250,000 pounds per square inch ("psi"), more preferably is between approximately 60,000 to 105,000 psi, and most preferably is between approximately 110,000 to 125,000 psi. The longitudinal body base material preferably has an ultimate tensile strength of between approximately 90,000 to 180,000 psi, more preferably is between approximately 90,000 to 125,000 psi, and most preferably is between approximately 105,000 to 125,000 psi at standard temperature and pressure conditions. Preferably, the longitudinal body base material that the reciprocating blade is made from has a hardness on the Rockwell C scale that is between approximately 30 to 60, more preferably is between approximately 40 to 50, and most preferably is between approximately 42 to 48. A preferred longitudinal body base material is AISI 4140 steel.

In a preferred aspect, the tooth material has a yield compression strength that is between approximately 400,000 to 600,000 psi, and most preferably is between approximately 435,000 to 520,000 psi. The tooth material preferably has an ultimate tensile strength of between approximately 92,800 to 290,000 psi. Preferably, the tooth material has a Rockwell C scale hardness of from 60 to 70, more preferably the tooth hardness is between 64 and 66.

Preferably, the cutting edge is formed from or coated with a material that has a hardness on the Rockwell C scale that is greater than the hardness of the material comprising the remainder of the blade. This makes the cutting edge less susceptible to indentation, which increases the life of the blade. A non-exhaustive list of materials that the cutting edge may be formed from, coated with, or welded to include a carbide or nitride such as cemented carbide, titanium carbide, tungsten carbide, boron carbide, silicon carbide, vanadium carbide, titanium carbide nitride, titanium nitride, titanium aluminum nitride, or cubic boron nitride, polycrystalline diamond, natural diamond, or any combination of these materials. A preferred material for forming the cutting teeth comprises a strip of AISI M2 steel.

If the reciprocating blade comprises a metal such as aluminum or steel, including any of the steel compositions described herein, the blade may be heat treated so that it falls within the ranges specified above for yield and ultimate tensile strength, modulus of elasticity, and hardness. The blade is heat treated to have a desired tensile strength, modulus of elasticity, and hardness so that the blade is durable and the cutting edge does not chip or crack. Any type of heat treatment process may be used to temper the blade including, but not limited to, annealing, precipitation hardening, martempering, austempering, and induction hardening. It is also within the scope of the invention for the surface of the blade to be hardened by a surface hardening process such as carburizing, nitriding, or flame hardening. Surface hardening may be used in conjunction with or separately from a heat treatment process that is performed on the entire blade. Additionally, different portions of the blade may be heat treated using different processes so that those portions have different properties with respect to each other. For example, the entire blade may be annealed, and then cutting edges may undergo surface hardening so that it is harder than the rest of the blade.

While any heat treatment process may be used for the reciprocating saw blade, preferably the blade is martempered or austempered. Martempering typically includes the steps of: (1) austenitizing steel, (2) quenching the steel in hot oil or molten salt to a temperature just above the temperature at which martensite forms, (3) maintaining this temperature for a period of time until the temperature throughout the steel is substantially uniform, and (4) cooling the steel at a moderate rate. The process may also include a fifth step of tempering the steel by heating it to a temperature between the austenife and martensite start temperatures, and then quenching the heated steel. Variations in the above-described martempering process are within the scope of the invention. Austempering typically includes the steps of: (1) austenitizing steel, (2) quenching the steel in hot oil or molten salt to a temperature that permits the formation of bainite, (3) maintaining that temperature until the temperature throughout the steel is substantially uniform, and (4) cooling the steel at a moderate rate to form bainite. Like with martempering, an additional step of tempering the steel may be used, however, it is typically not necessary. Preferably, the austempering or martempering process is carried out in a manner so that the blade has a yield and ultimate tensile strength, modulus of elasticity, and hardness with values as specified above.

It will also be appreciated that the cutting edge(s) may also comprise more than one material. For example, the cutting edge(s) may comprise a base formed from any of the materials identified above that is coated with another of the materials identified above. In one embodiment, the cutting edge(s) comprises a base formed from cemented carbide that is coated with a material such as titanium carbide, titanium nitride, titanium carbide nitride, or titanium aluminum nitride. The cutting edge(s) may also be sharpened or re-sharpened by conventional means over the life of the blade.

In an exemplary method for manufacturing the reciprocating saw blade of the present invention, long strips comprised of the teeth material and a long body portion comprised of the longitudinal body base material are provided. These long strips and the long body portion may be dozens to hundreds of feet long, and may be coiled for ease of handling. The long strips of teeth material are welded, preferably by either laser beam welding or electron beam welding, to the long opposing parallel edges of the long body portion comprised of longitudinal body base material. The teeth material along the first long edge may be the same or different from the teeth material along the second long edge which is parallel to the first long edge. Teeth are then formed (e.g., by milling, stamping, or otherwise cutting) along each of the long opposing edges comprised of the teeth material in the teeth configuration set forth herein. If needed, heat treatment is applied. In essence, a long ream or sheet of longitudinal body based material is formed in which there are teeth formed of the teeth material along two opposing parallel edges. This long ream of material is coiled and placed in a stamping machine. The stamping machine forms the first end (tang end) and the second end of the blade in the ream of material. The first and second longitudinal cutting edge are formed from the long opposing edges of the ream. As a result, the reciprocating saw blade of the present invention can be manufactured at relatively low cost.

From the foregoing it will be seen that this invention is one well adapted to attain all ends and objectives hereinabove set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. For example, the configuration of the mounting structure may vary so long as the mounting structure permits insertion of the reciprocating blade into the blade holder of the reciprocating saw. Likewise, the size, shape, and orientation of the teeth, may vary so long as cutting along the first longitudinal cutting edge occurs substantially on the pull stroke while cutting at least one longitudinal cutting edge (preferably the second longitudinal cutting edge) occurs substantially on the push stroke. Further, although both longitudinal cutting edges are generally parallel to the longitudinal axis L, it will be appreciated that the longitudinal cutting edge itself need not be a straight edge, but may have some curvature or angles, for example like a butter knife. Thus, while specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

We claim:

1. A reciprocating saw blade engageable with a reciprocating saw for driving the reciprocating saw blade in a reciprocating motion comprising a push stroke and a pull stroke comprising:
   a longitudinal body having a first end and a second end, a first longitudinal cutting edge and a second longitudinal cutting edge disposed along said longitudinal body; wherein said first longitudinal cutting edge and said second longitudinal cutting edge are parallel to each other;
   a mounting structure located at said first end of said longitudinal body and angled at an acute angle relative to said first longitudinal cutting edge; said mounting structure adapted to be mounted in a reciprocating saw blade holder; said mounting structure formed unitary with said longitudinal body;
   wherein said first longitudinal cutting edge has a plurality of teeth oriented for cutting substantially on the pull stroke;
   wherein said second longitudinal cutting edge has a plurality of teeth oriented for cutting substantially on the push stroke; and
   wherein the second end contains a plurality of teeth configured in the same manner as the first longitudinal cutting edge for cutting substantially on the pull stroke.

2. The reciprocating saw blade of claim 1 wherein said mounting structure comprises a tang body section having an aperture therein.

3. The reciprocating saw blade of claim 1 wherein said mounting structure comprises a tang body section having a slot between two tang stems.

4. The reciprocating saw blade of claim 1 where substantially all of the teeth on said first longitudinal cutting edge have a rake face facing the first end of the blade and a relief face facing the second end of the blade.

5. The reciprocating saw blade of claim 1 where substantially all of the teeth on said second longitudinal cutting edge have a rake face facing the second end of the blade and a relief face facing the first end of the blade.

6. The reciprocating saw blade of claim 1 wherein more than about 70% of the teeth on said second longitudinal cutting edge have a rake face facing the second end of the blade and a relief face facing the first end of the blade.

7. The reciprocating saw blade of claim 1 wherein the blade comprises a unitary body formed from a generally planar sheet of material.

8. The reciprocating saw blade of claim 1 wherein the second end is round.

9. The reciprocating saw blade of claim 1 wherein the first longitudinal cutting edge has teeth that have a different shape than said teeth on said second longitudinal cutting edge.

10. The reciprocating saw blade of claim 1 wherein the first longitudinal cutting edge has teeth that have a different size than said teeth on said second longitudinal cutting edge.

11. The reciprocating saw blade of claim 1 wherein the first longitudinal cutting edge has teeth that are the same size and shape as the teeth on said second longitudinal cutting edge.

12. The reciprocating saw blade of claim 1 wherein as least one of said first longitudinal cutting edge and said second longitudinal cutting edge is comprised of a strip of tooth material that is welded to the longitudinal body.

13. The reciprocating saw blade of claim 12 wherein said longitudinal body is comprised of a longitudinal body base material having a hardness on a Rockwell C scale that is between 30 to 60 and wherein said strip of tooth material has a hardness on a Rockwell C scale between 60 to 69.

14. The reciprocating saw blade of claim 12 wherein both said first longitudinal cutting edge and said second longitudinal cutting edge are comprised of a strip of tooth material that is welded to the longitudinal body.

15. The reciprocating saw blade of claim 1, wherein substantially all of the teeth on said first longitudinal cutting edge have a rake face facing the first end of the blade and a relief face facing the second end of the blade;
    wherein substantially all of the teeth on said second longitudinal cutting edge have a rake face facing the second end of the blade and a relief face facing the first end of the blade; and
wherein the second end is rounded.

\* \* \* \* \*

UNITED STATES PATENT AND TRADEMARK OFFICE
CERTIFICATE OF CORRECTION

| | |
|---|---|
| PATENT NO. | : 10,639,733 B2 |
| APPLICATION NO. | : 14/119502 |
| DATED | : May 5, 2020 |
| INVENTOR(S) | : Doug Campbell, Ryan Campbell and Russell D. Fries |

Page 1 of 1

It is certified that error appears in the above-identified patent and that said Letters Patent is hereby corrected as shown below:

In the Specification

Column 12
Line 53, delete "austenife" and insert -- austenite -- therefor.

Signed and Sealed this
Ninth Day of June, 2020

Andrei Iancu
*Director of the United States Patent and Trademark Office*